US008089957B2

(12) United States Patent
Bennett

(10) Patent No.: US 8,089,957 B2
(45) Date of Patent: Jan. 3, 2012

(54) SECURE IP ADDRESS EXCHANGE IN CENTRAL AND DISTRIBUTED SERVER ENVIRONMENTS

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1460 days.

(21) Appl. No.: 11/341,815

(22) Filed: Jan. 27, 2006

(65) Prior Publication Data

US 2007/0189276 A1    Aug. 16, 2007

(51) Int. Cl.
*H04L 12/66* (2006.01)
*H04L 12/56* (2006.01)
(52) U.S. Cl. .................. 370/356; 370/392; 709/203
(58) Field of Classification Search .................. None
See application file for complete search history.

(56) References Cited

U.S. PATENT DOCUMENTS

| 6,765,896 | B1 * | 7/2004 | Ahmed et al. | 370/338 |
| 7,272,379 | B1 * | 9/2007 | Tang et al. | 455/406 |
| 2002/0156843 | A1 * | 10/2002 | Hashimoto et al. | 709/203 |
| 2007/0133525 | A1 * | 6/2007 | McGary | 370/356 |

* cited by examiner

*Primary Examiner* — Melanie Jaganna Than
(74) *Attorney, Agent, or Firm* — Garlick Harrison & Markison; Bruce E. Garlick

(57) ABSTRACT

Embodiments of the present invention provide a network infrastructure operable to support the exchange of communications, such as textual, image, video and voice communications, between a first client terminal having a first user identifier and service by a first service provider and a second (destination) client terminal having a second user identifier and serviced by a second service provider. This network infrastructure includes a packet-switch network, a shared database and a number of client terminals serviced by different service providers. These terminals include a network interface and are identified by their service provider by a network address. The shared database associates user identifiers with network addresses. This allows a user to access the shared database in order to initiate a call request from the first client terminal to the second client terminal. The first client terminal receives the network address or vectoring information on the network address of the destination terminal through the shared database. This shared database may also have metadata used to manage the call.

21 Claims, 14 Drawing Sheets

SECURE IP ADDRESS EXCHANGE IN CENTRAL AND DISTRIBUTED SERVER ENVIRONMENTS

TECHNICAL FIELD OF THE INVENTION

This invention relates generally to network based communications and more particularly to management of packet data communications serviced by multiple communication networks.

BACKGROUND OF THE INVENTION

Communication technologies currently allow Internet or network based voice communications. Internet voice communications allow users to make telephone calls using a computer network or other data network. Internet voice communications convert a voice signal into a digital packetized signal that travels over the network to the destination terminal. These Internet-based communications may be made through a personal computer (PC) attached to the Internet or other like network, or a traditional telephone having an adaptor that allows the traditional telephone to interface and place phone calls over the network.

One such Internet Protocol (IP) enabled service is known as Voice over Internet protocol (VoIP). VoIP allows voice communications to be packetized and exchanged using a broadband Internet connection instead of an analog or a traditional phone line. However, these Internet voice services currently allow users to call only other users that utilize the same service provider or to users available through the public switched telephone network (PSTN). This limitation may be imposed by incompatible CODECs chosen to packetize the voice communications, network addressing issues or other like difficulties.

The Internet has also facilitated text messaging between two or more users, first with email, and now instant messaging (IM). Email communications do not require common service providers to be used by both the originating terminal and the destination terminal. An email address provides vectoring information to identify the communications intended destination and is made of several parts. The first part of the address is a username, identifier, or handle that identifies a unique user within a server. The ampersand (@) separates the username from the host name. The host name uniquely identifies the server computer network and is the second part of the email address. This host name may include a suffix that identifies the kind of organization operating the server such as .com, .edu, .gov, .mil, etc. This format for an email address identifies a location to which an email can be delivered. Since network based communications often require IP addresses for the destination terminal, and these addresses frequently change, Internet-based voice communications currently lack this addressing ability.

IM is a form of electronic communication which involves immediate correspondence between two or more users of a common IM service who are online simultaneously. To access such functionality, each user downloads and installs the same IM service provider's support software on their personal computing device. When in operation, the software attempts to maintain with a central server of that IM service provider the current IP address of the underlying user's personal computing device. If two users have such software in operation, either may initiate a correspondence to the other by retrieving the IP address of the other from the central server. However, IM, unlike email, requires both of the users to employ the same software and central server, i.e., the same IM service provider. Popular instant messaging services supporting at least textual correspondence include AOL's Instant Messenger (AIM), Microsoft MSN Messenger and Yahoo Messenger, for example. Some recent versions of IM also support voice communications (correspondence) between these users.

Instead of assigning permanent IP addresses to a computing device, many Internet Service Providers (ISPs) assign temporary IP addresses using, for example, a dynamic host configuration protocol (DHCP). Using the DHCP protocol, an ISP's DHCP server allocates and reallocates a pool of IP addresses as client devices log in and out. Upon logging in, each client device request the assignment of an IP address. The DHCP server responds by assigning a currently unused IP address from its pool. When a client device logs out or otherwise disconnects from the network, the DHCP server is free to reallocate the IP address to another client device. DHCP servers also maintain a database that associates each client device with its currently assigned IP address. With such dynamic address allocation, a client device may have a different IP address every time the device connects to the network. Additionally, DHCP servers may also support a mix of static and dynamic IP addresses.

The IP addresses of most client devices frequently change, using a current IP address to permanently and uniquely identify each client device is not always possible. Thus, when a user of one client device desires to contact another, a service provider can assist if both sign up for that service provider's maintenance and sharing of current IP addresses, i.e., if both users become members. More specifically, a typical IM or VoIP service provider maintains a database on a central server. The database associates each member's "name identifier" with the current IP addresses of that member's client device. To maintain an accurate database, each client device delivers its underlying name identifier and current IP address to the central server for updating. Only through such updating can a member reasonably expect to receive incoming service.

Static IP addresses are also in use, but are less common for client devices because of their frequent network detachment for relatively long periods before reattaching. Therefore, a substantial percentage of such statically assigned IP addresses are not in use at any given time. Additionally, as devices change ISPs, even static IP addresses previously assigned will change.

As previously stated, these network-based voice communication services lack the ability to service calls entirely within the network environment when the client terminals are serviced by different service providers. As the number of providers offering these services increase, improved ways of handling communications between service providers is required.

Further limitations and disadvantages of conventional and traditional IM and Internet voice systems and related functionality will become apparent to one of ordinary skill in the art through comparison with the present invention described herein.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the figures, like numerals being used to refer to like and corresponding parts of the various drawings.

Figure 1:
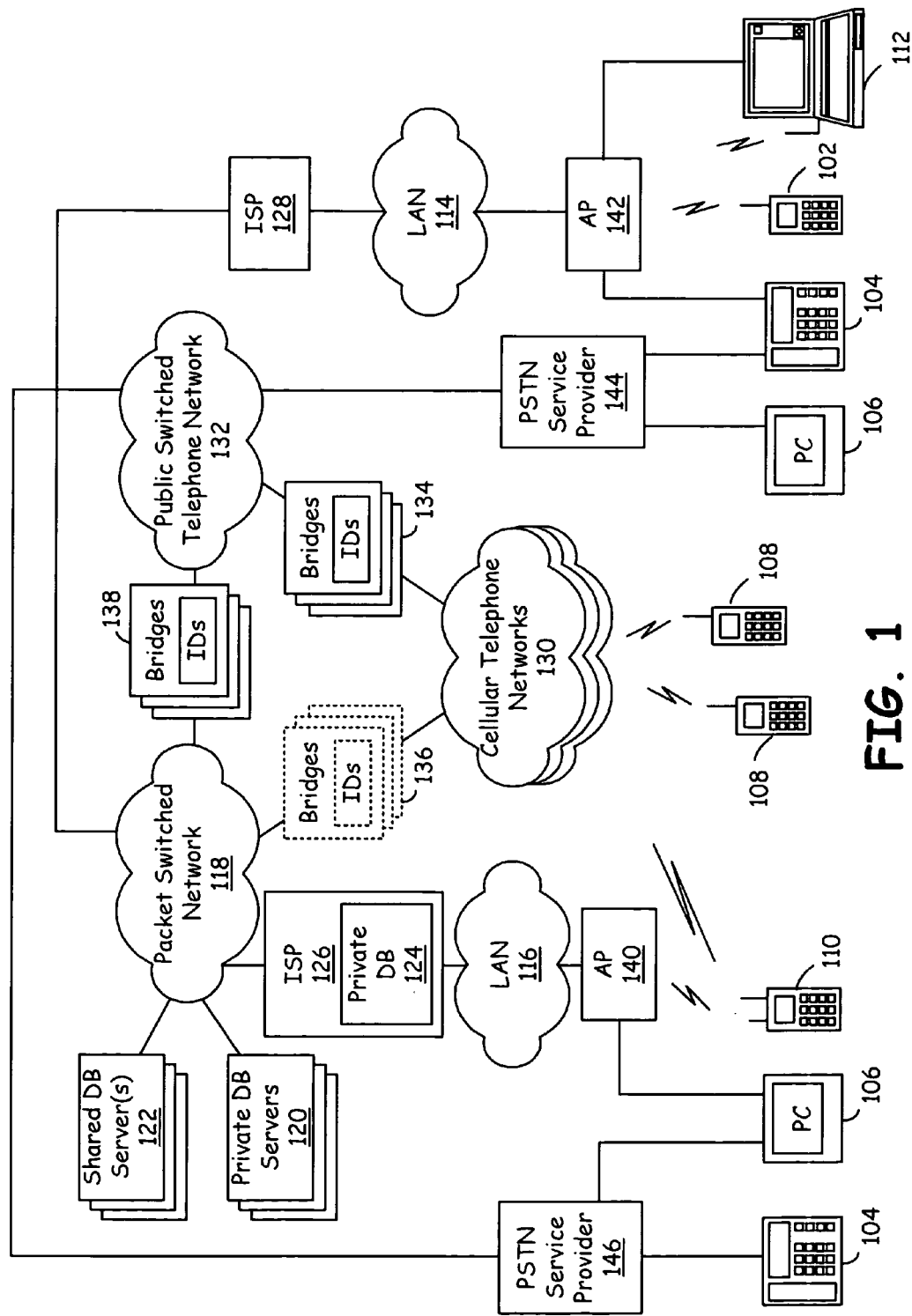
FIG. 1 is a system diagram illustrating network of client devices that intercommunicate through the registration and secure sharing of network addresses in accordance with the present invention.

FIG. 1 is a system diagram illustrating client terminals, wireless communication systems, and wired communications systems that operate in accordance with one or more embodiments of the present invention. A system constructed and operating according to the present invention includes client terminals 102 and 104. Client terminal 102 is a handheld device, e.g., cell phone, data terminal, voice over Internet protocol (VOIP) handset, etc. Client terminal 104 is a wired terminal such as a PSTN telephone. Client terminal 106 is a personnel computer. Client terminal 108 may be a cellular or wireless telephone. Client terminal 110 may be a wireless local area network (WLAN)/cellular telephone operable to communicate either through a WLAN or cellular telephone network. Client terminal 112 is a laptop computer. Client terminals 102, 108, 110 and 112 may support wireless communications according to one or more communication protocols including, but not limited to, Wireless Local Area Network (WLAN) protocols such as IEEE 802.11a, b, g, and n, Wireless Personal Area Network (WPAN) protocols such as Bluetooth, cellular protocols such as GSM, IS-95, 1xRTT, 1xEV, etc., and/or other wireless protocols. Client terminals 108 and 110 also support wireless communications via cellular telephone networks 130 and in the case of client terminal 110 wireless communications via a wireless network interface to an associated access point such as access point 140. Further, each of the client terminals may also support one or more wired communications and wired communication standards, including one or more versions of the Ethernet standard and/or other wired standards.

The network infrastructure in FIG. 1 further includes local area networks (LAN) 114 and 116, a packet switch network 118, such as but not limited to the Internet, public switch telephone network (PSTN) 132, cellular telephone networks 130, database servers 120 and 122, private database 124, PSTN service providers 144 and 146, access points (AP) 140 and 142, network bridges 134, 136, and 138, and packet switch network service providers 126 and 128. The wired links include actual wires, optical connections, and/or wired equivalent connectivity.

Servers 120, 122 and private database 124 couples to the packet switched network 118 and may communicate with the client devices 102 through 112. This may be accomplished through wired or wireless links such as those provided by LAN 114 and 116 or AP 140 and 142.

Access points 140 and 142 are operable to support a WLAN protocol such as one or more of the IEEE 802.11 communication protocols and/or a WPAN communication protocol such as the Bluetooth protocol.

Client terminals may associate with one or more access points or networks at any time. For example, client terminals 102 and/or 104 may be members of LAN 114 and the WLAN of AP 142. These associations may change over time. For example, if client device 102 moves within the coverage area of access point 140, client terminal 102 will associate with access point 140. Further, when client terminal 102 is within the operating range of other access points, client terminal 102 will associate with these access points as well. However, when client terminal 102 moves outside of one or more of the operating ranges of any access points, it may disassociate (by default) from one or more of the access points.

The association of the client terminals with the various wireless and wired networks results in the client terminals potentially being assigned a number of (Internet Protocol) IP addresses. The client terminals may then associate internally their username, handle or identifier with their network address (i.e. IP address in the case of internet communications). The client terminal 102 then shares the addressing information and cross reference identifies with service providers or public/private databases as will be discussed below. The network infrastructure provided in FIG. 1 may support call exchange between a first client terminal and a second client terminal wherein the first and second client terminal are serviced by different service providers. In these embodiments the client terminals access a private database 120, a shared database 122, or a local private database 124, to retrieve addressing information using a cross-reference identifier, i.e., user name, handle. The client terminal may use a user name, handle, or other like identifier as an input, as a cross-reference identifier, in order to retrieve an IP address or address vectoring information in order to initiate and manage calls between client terminals serviced by different service providers.

Figure 2:
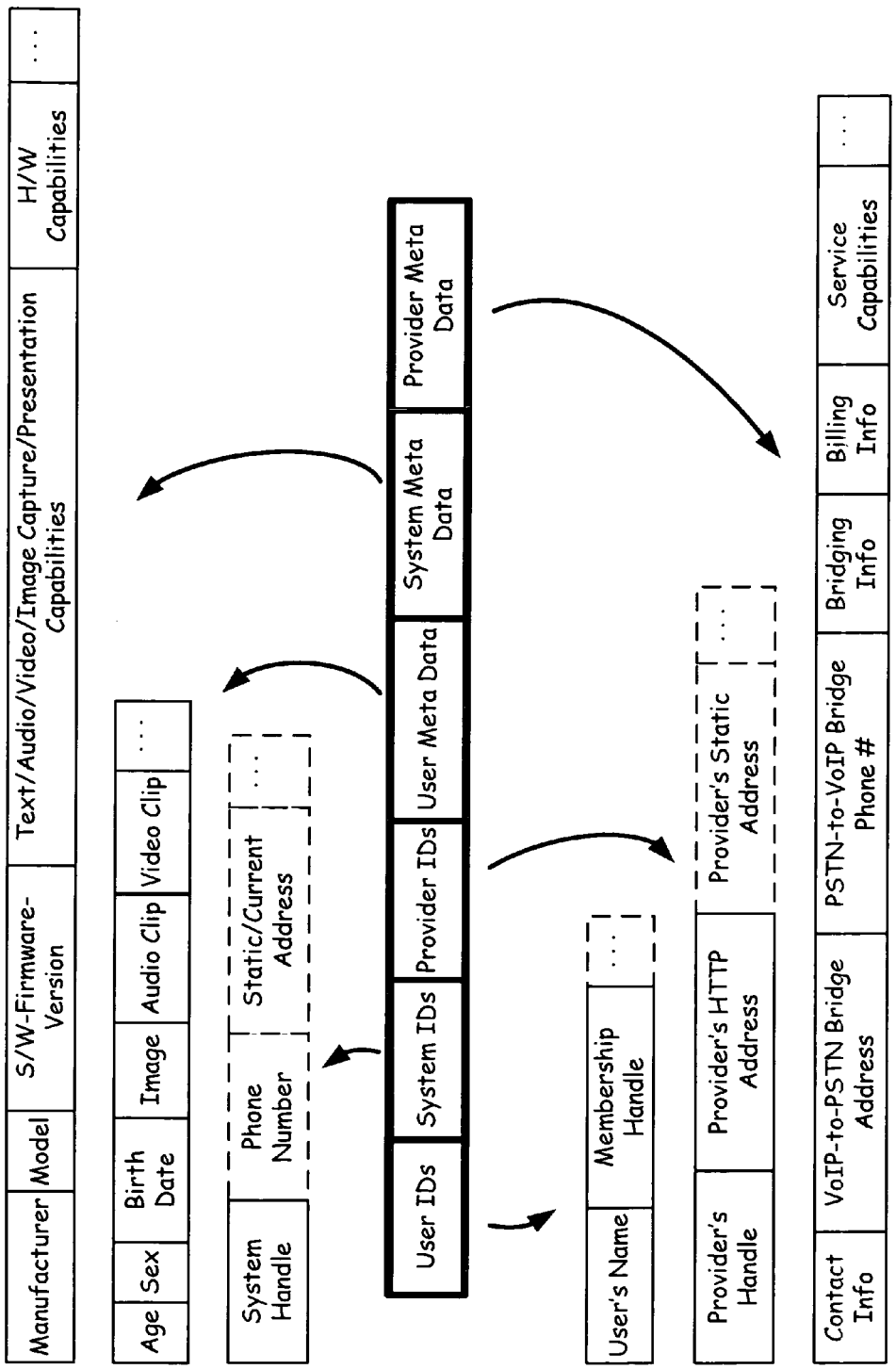
FIG. 2 depicts various cross-reference identifiers which may include one or more user identifiers, terminal identifiers, service provider identifiers, and associated meta data in accordance with an embodiment of the present invention.

FIG. 2 depicts various cross reference identifiers which may include one or more user identifiers, terminal identifiers and service provider identifiers. For example, user identifiers may include user name, member handle or other like information. System identifiers may include a system handle, phone number, ESN, stacker card address, or other like information. A provider I.D. may include a provider handle, a network address, a static address, or other like information. In addition to the user system and provider identifiers, various meta data may be associated with these identifiers. For example, personal information such as the age, sex, birth date, image, audio clip, video clip, authorization information or other like information may be associated with a user. The terminal identifier may contain information such as manufacturer, model number, software version, multi media capabilities, hardware capabilities, or other like information. The service provider Meta data may include contact information. All this information may be stored within the public/private databases of FIG. 1 and used to facilitate and manage calls between client terminals.

User identifiers may comprise a user's name or some "handle" that uniquely identifies a user with that service provider. A service provider identifier might comprise a web address, provider name, or the provider's static IP address. The terminal identifier might be a computer name, telephone number, or serial number, for example. User information might be nearly anything related or unrelated to the overlying service (age, sex, birthdate, etc.). Terminal information might include manufacturer, model number, firmware/software/hardware version, image/video/audio capabilities, processing power, memory/storage capability, battery capability and status, operational status, available CODECs and versions, etc. As with other metadata, the terminal information might be related or not to the overlying service. Service provider information might include zero or more of service descriptions, service characteristics/limitations, service status, billing info, etc.

Figure 3:
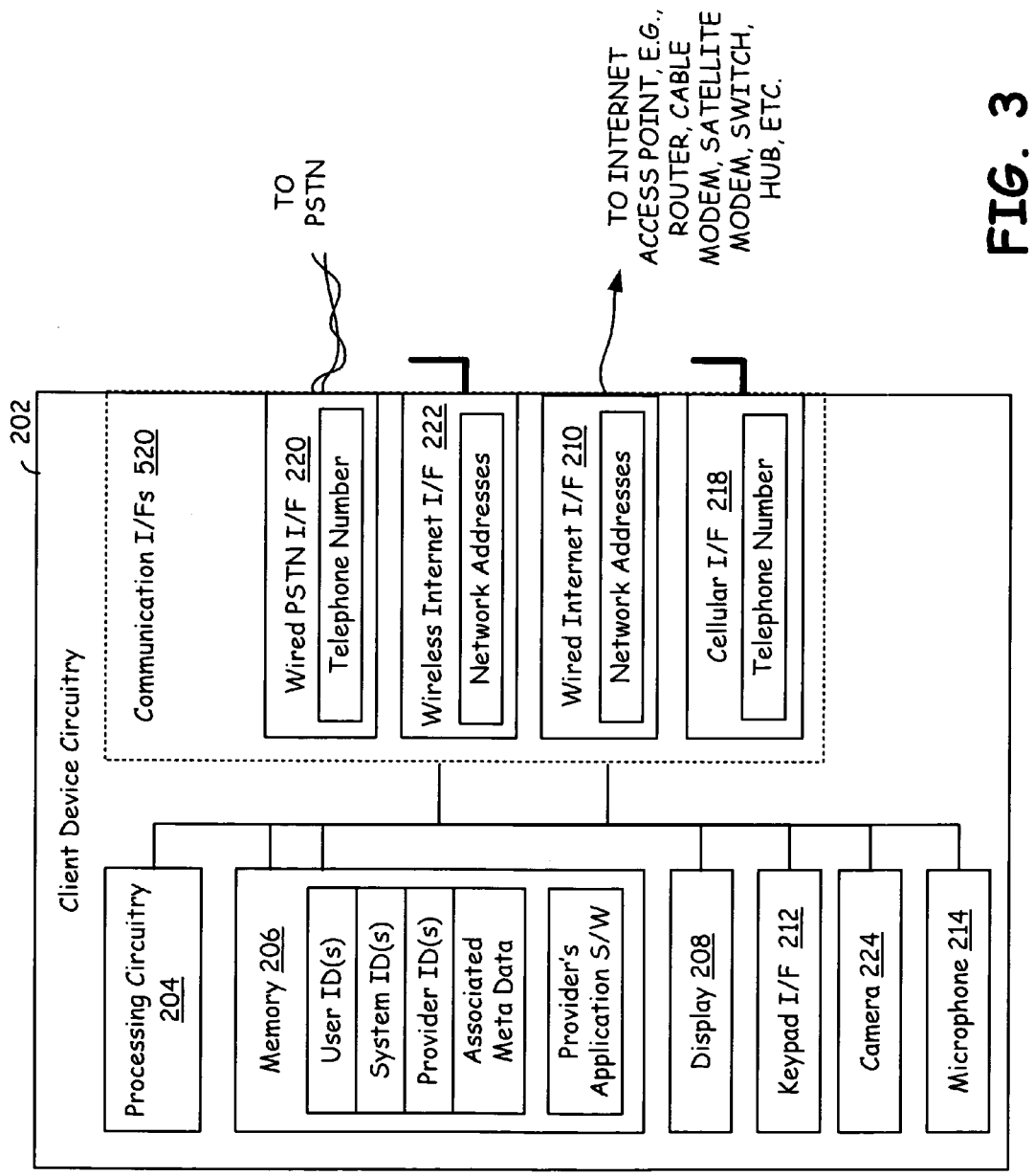
FIG. 3 is a schematic block diagram illustrating the circuitry of one of the client terminals of FIG. 1, according to one embodiment of the present invention.

FIG. 3 is a schematic block diagram illustrating a client terminal constructed according to at least one embodiment of the present invention. Client terminal 202 includes host processing circuitry 204, memory 206, display 208, wired network interface 210, keypad interface 212, microphone/speaker 214, camera 224, cellular network interface 218, PSTN interface 220, and wireless network interface 222. Host processing circuitry 204 may be a microprocessor, a digital signal processor, an application specific integrated circuit, a state machine, an FPGA, and/or other circuitry that is operable to execute software instructions and to manipulate data. Memory 206 may be RAM, ROM, PROM, hard disk drive, and/or other components capable of storing software instructions and data. Network interface 210 may support wired or wireless communications according to applicable communication protocol standards.

The wired network interface 210 and wireless network interface 222 may support packet switched network communications as was previously shown with reference to FIG. 1. Thus, the client terminal may support communications with a router, cable modem, satellite modem, a switch, a hub, and/or another device. Further, the interfaces may support WLAN communications, cellular communications, or other packet switched communications. Not all client devices utilize all of the interfaces 210, 218, 220, and 222. For example, as illustrated in FIG. 1, the client terminal 106, a personal computer, is only configured with the wired interface 210.

Host processing circuitry 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory 206 may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing module 32 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The memory stores, and the processing circuitry executes, operational instructions.

Client terminal and the client device circuitry 202 supports call exchange with a second or destination client terminal. This first client terminal may be serviced by a first service provider while the destination client terminal is serviced by a second service provider. The communication interfaces allow the client terminal to establish communications with various available networks. Specifically, wired interface 210 and wireless interface 222 allow communication to be established with a packet switch network. When initiating a call the user will interface through the display 208, keyboard interface 212, or microphone 214 to initiate a call. Initiation of a call may involve inputting a handle that uniquely identifies the user associated with the destination terminal. The client terminal may then access a database to obtain address or vectoring information for the destination terminal. Both the initiating and destination terminals not only store information in memory 206 but may upload this information or a portion of this information to the public or private databases. In this way processing circuitry 204 may properly configure the communications with the client termination for communications with the destination terminal based on the terminal and provider capabilities as well as user-defined inputs provided to both the initiating and the destination client terminal.

Figure 4A:
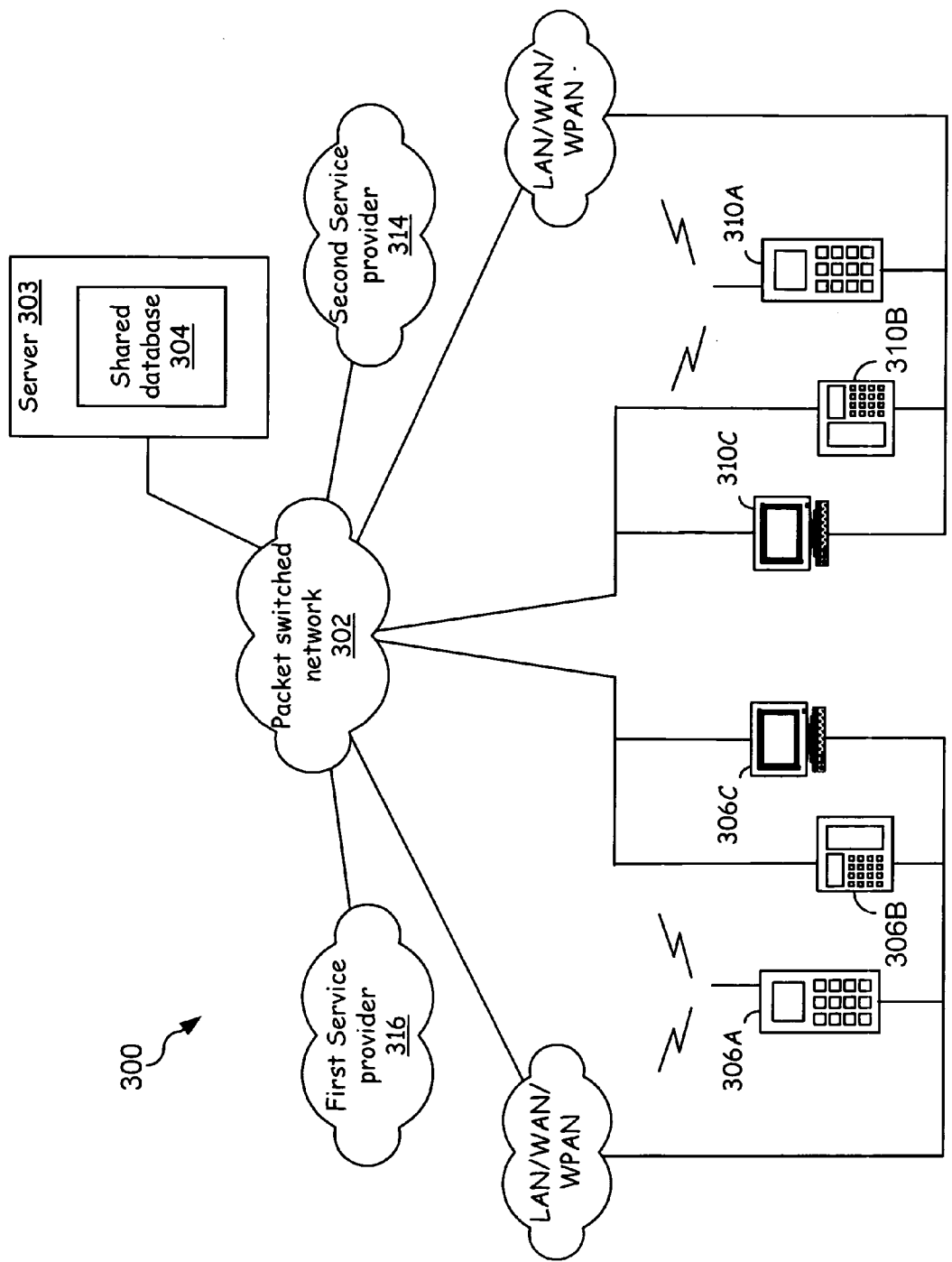
FIG. 4A is a system diagram illustrating a network infrastructure operable to support network based communications that intercommunicate through the registration and secure sharing of network addresses from multiple service providers in accordance with one or more embodiments of the present invention.

FIG. 4A is a system diagram illustrating a network infrastructure operable to support call exchanges between any two or more of a plurality of client terminals in accordance with the present invention. This network infrastructure 300 includes a packet-switched network 302, a shared database 304, a first client terminal, such as wireless client terminal 306A, wired client terminal 306B, or PC terminal 306C, a second client terminal, such as wireless client terminal 310A, wired client terminal 310B, or PC terminal 310C, a second service provider 314, and a first service provider 316. Client terminals 306A, 306B, 306C, 310A, 310B and 310C may have a username, handle or other identifier associated with the device or user. Additionally, these client terminals may support network based communications using a service provider such as but not limited to Skype, AOL's Instant Messenger (AIM), Microsoft MSN Messenger, Yahoo Messenger, and other like services that provide text and voice services.

The username handle or other identifier may be established with service provider 316 or 314. First service provider 316 and second service provider 314, as well as shared database 304, may all communicatively couple to the packet-switch network 302. The service providers servicing the first and second client terminal may differ according to various embodiments of the present invention. The packet-switch network 302 may be a network such as but not limited to the Internet or other like packet-switched network.

The client terminals have identifiers such as a username or handle and may be associated with unique service providers. The username or handle may, like an email address, contain a first part that identifies the user and a second part that identifies the host or service provider. Additionally, each client terminal may be assigned unique IP address when registered with a servicing Internet Servicing provider (ISP) which may change over time. Client terminal registers with the service provider in order to enable communications via the service provider. Either the client terminal or the service provider may then store a network or IP address associated with the client terminal and username, identifier or handle within the shared database.

This network infrastructure supports the exchange of calls between client terminals serviced by different service providers via packet switch network 302. When first client terminal 306 seeks to establish or initiate a call request to second client terminal 310 using shared database 304, which may be hosted on web server 303, to access a network address or vectoring information associated with the destination terminal. Contained within client shared database 304 are username, identifier, or handle information associated with the client terminals, network addresses and metadata. This metadata may contain network capabilities information, communication capabilities information, terminal capabilities information, user defined criteria, and/or security information. In one embodiment this information may describe the CODECs which are to be employed in order to support the communications between the first client terminal and second client terminal. Other types of information that may be associated with the client terminal via the shared database may be security information. Security information may require that the second client terminal contain authorization information for the first client terminal prior to supplying the network address to the first client terminal. In other embodiments this metadata may be CODEC capabilities, multimedia capabilities, latency information, user information, user email address information, user phone number information, VoIP client terminal location information, quality information, VoIP service provider, session information, network information, call authorization criteria, pathway information, port information. User defined metadata may describe how calls are to be handled based on the time of day user, time of day for the call request, time of day for the client terminal(s) associated with the destination IP addresses, day of week for the user, day of week for the call request, day of week for the client terminal (s) associated with the destination IP addresses, geographic location of the user, geographic location initiating the call request, geographic location of the client terminal(s) associated with the destination IP addresses, expected proximity of the user to the VoIP client terminal(s) associated with the destination IP addresses, and/or the relationship of the user to a party initiating the call request to the user receiving the call.

In other embodiments, these client terminals may be associated with a number of network addresses. Individual network addresses may be associated with the type of incoming call, the specific communication pathway, or other factors associated with the communication. For example, a terminal may have one IP address for voice communication and other IP addresses for a text, multimedia or audio/video communication. Other network addresses may be available for technical support.

Shared database 304 may store vectoring information to the service providers in place of specific network addresses associated with individual client terminals. Thus, when a first client terminal initiates a call or call request, the first client terminal retrieves vectoring information from shared database 304. This vectoring information may include a second service provider network address that directs the first client terminal to the second communication. The second service provider then provides the network address of the destination client terminal directly to the first client terminal. The first client terminal then may use the network address to establish a call with the second (destination) client terminal.

FIG. 4A sets forth a shared database solution that stores all of the currently "unshared" information from a plurality of service providers. In other words, a central database receives a copy of each (at least a portion of each) service provider's database. Each service provider may: 1) continue to operate and maintain a local copy with period or simultaneous shared database updating; 2) maintain additional cross reference identifiers and metadata than that copied to the shared database; and 3) dump duplicate information from the local database and rely on the shared database's storage.

Figure 4B:
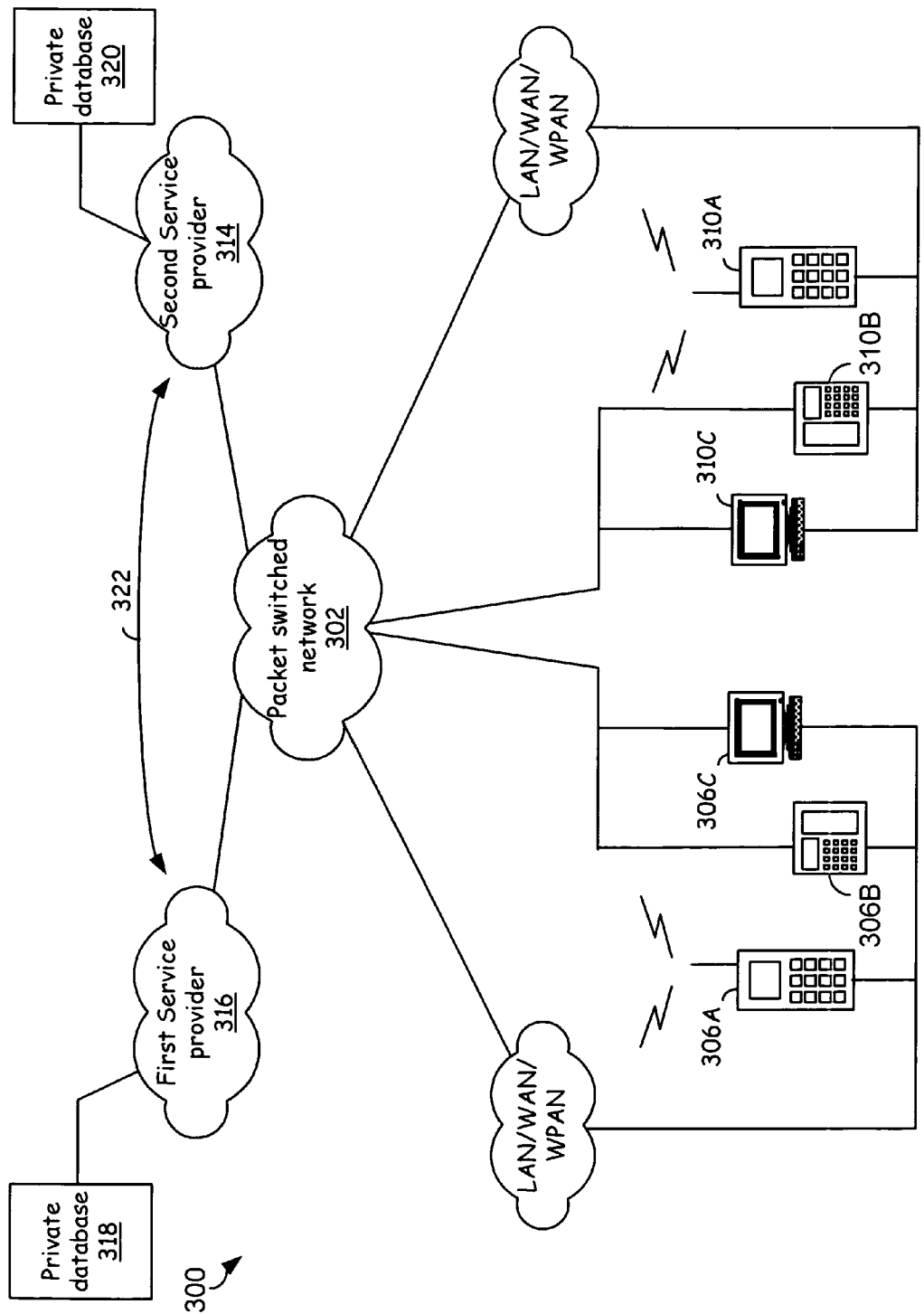
FIG. 4B is a system diagram illustrating a network infrastructure operable to support network based communications that intercommunicate through the registration and secure sharing of network addresses from multiple service providers in accordance with one or more embodiments of the present invention.

Another embodiment, as illustrated in FIG. 4B may not entail a central shared server at all but merely a mechanism for sharing. This may involve a communication pathway 322 between service providers 314 and 316, through which one service provider (i.e. service provider 314) would probe the private database (i.e. database 320) to find a foreign terminal's network address and more. That probing could also include "status" and other information as described with reference to FIG. 2 in an ongoing manner. In this scenario, the initiating client device (i.e. 306A, 306B or 306C) need only communicate with its service provider (i.e. service provider 316) to retrieve the information required to initiate and manage a call to destination client device (i.e. 310A, 310B or 310C).

Communication pathway 322 may entail an Industry Standard interface between service providers 314 and 316 or a proprietary interface. Alternatively, the burden could be placed on the client device. Therein, an initiating client device (i.e. 306A, 306B or 306C) would need to use the service provider and client terminal identifiers to locate the foreign service provider and make the request. As above, this could entail an Industry Standard interface between unassociated client's and service providers. In addition or alternatively, this might involve downloading a small software module for non-member clients that governs a proprietary interaction and/or proprietary graphical interface. The display could be fully or partially combined (that is native service provider phone book and interaction may integrate a foreign user and underlying foreign service provider. Alternatively, the display may be generated in a separate application using via, for example, the non-member download module comprising an independent application.

Figure 5:
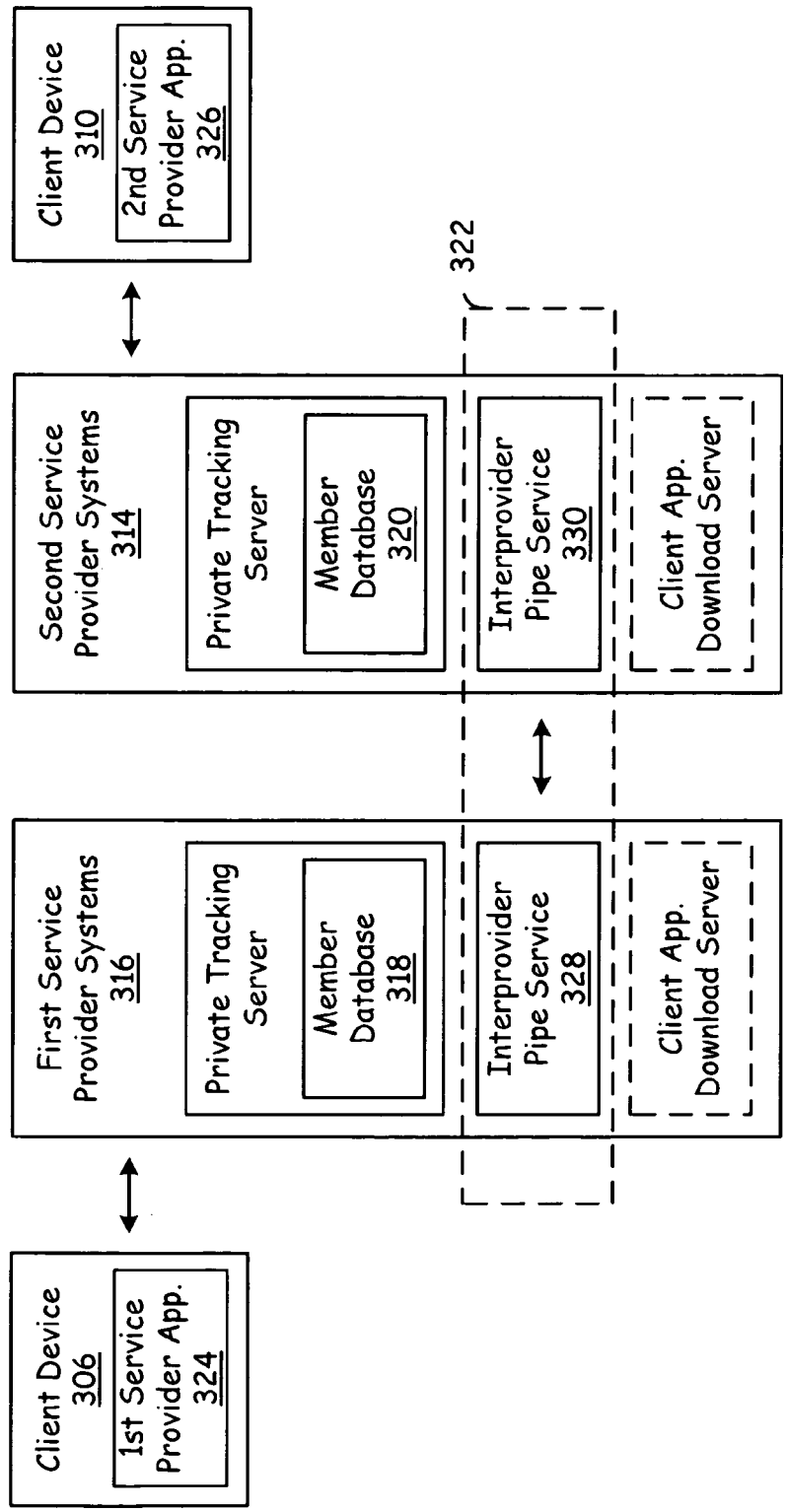
FIG. 5 illustrates how information or communications may flow between client devices and service providers in order to facilitate a call or communication between the first client device and a destination client device wherein both client devices are serviced by different service providers in accordance with one or more embodiments of the present invention.

FIG. 5 illustrates how information may flow in order to facilitate a call or communication between a first client device 306 and the destination client device 310. To facilitate this communication, a first service provider application 324 may be executed on client device 306 to facilitate the call. Here the client device 306 uses first service provider application 324 to establish a communication with the first service provider 316. As previously stated, first service provider 316 and second service provider 314 may contain private member databases 318 and 320, respectively. The first service provider receiving a request to establish a communication within destination terminal 310 which is service by second service provider 314 may utilize an inter-provider communication pathway 322 which may be facilitated with inter-provider pipe service 328 and 330. Thus, the call from the first client device 306 is directed from the first service provider 316 to the second service provider 314 in order to access address and information for the destination client terminal 310. Once the information is received, client device 306 may directly establish communications using the information provided with client device 310.

Figure 6:
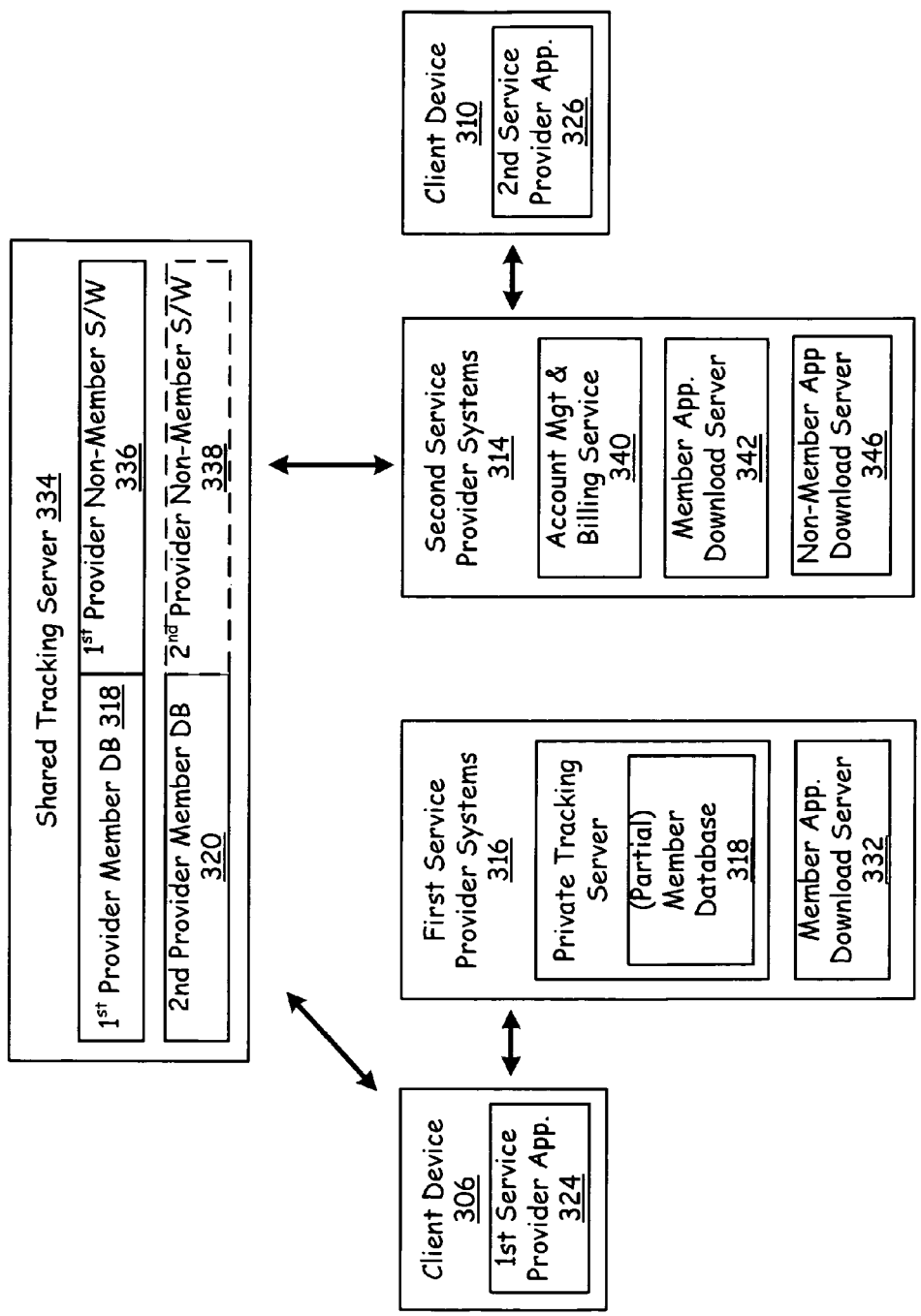
FIG. 6 provides a block diagram illustrating how information, service providers and backing servers are serviced by differing service providers in accordance with one or more embodiments of the present invention.

Software applications 324 and 326 executed on the client devices allow a user to associate and report the various devices and addresses through which he may be contacted to the database maintained by the service provider. In FIG. 6, instead of establishing a private communication pathway for pipe 322 in between service providers 316 and 314, these devices access a shared tracking server 334 which may contain some or all of the information contained within this service provider's databases as indicated by the first member database 318 and second provider member database 320 being available within the shared tracking server 334. This database may also include status data as to the availability and receipt capabilities of the user as is known by their servicing service provider. The first service provider application 324 and second service provider application 326, respectively, may be downloaded from a download server provided by the servicing service provider.

Figure 7:
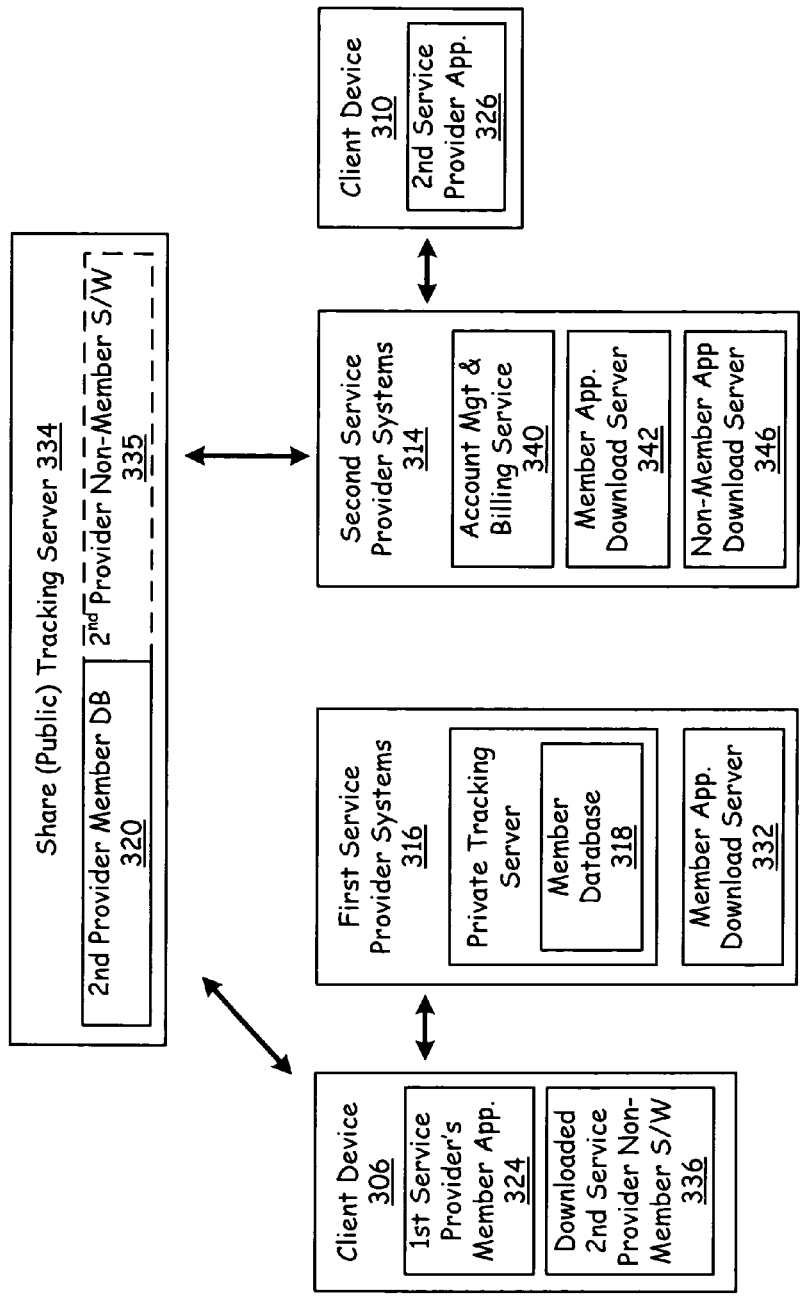
FIG. 7 provides a block diagram illustrating how information, service providers and backing servers are serviced by differing service providers in accordance with one or more embodiments of the present invention.

Additionally, application 324 and application 326 may be used when interfacing between the first client device 306 and second client device 310. For example, in FIG. 6, the first service provider application may be used to interface with the second client device using information received from a shared tracking server. In this instance, the display may be identical of the display or the user interface associated with a call to client device 310 using the second service provider may be identical to the same interface used to interact with other users within the first service provider system 316. In FIG. 7, a second service provider non-member software application 338 may be downloaded to the client device 306 when establishing communications with client device 310. In this case, the second service provider non-member software 338 may be downloaded from the shared or public tracking server 334 and may allow client device 306 to access the second provider member database 320. Additionally, account management and billing services 340 may interact with the second service provider non-member software in order to track incoming calls. Alternatively, the first user may be charged a licensing fee which is tracked by the account management and billing software service of billing service 340 when the non-member application is downloaded from the public tracking server and ultimately from the non-member application download server 346 within the second service provider system 314. This second service provider non-member software 338 may be integrated within first service provider member application 324 or a stand alone application that has a distinct user interface.

Figure 8:
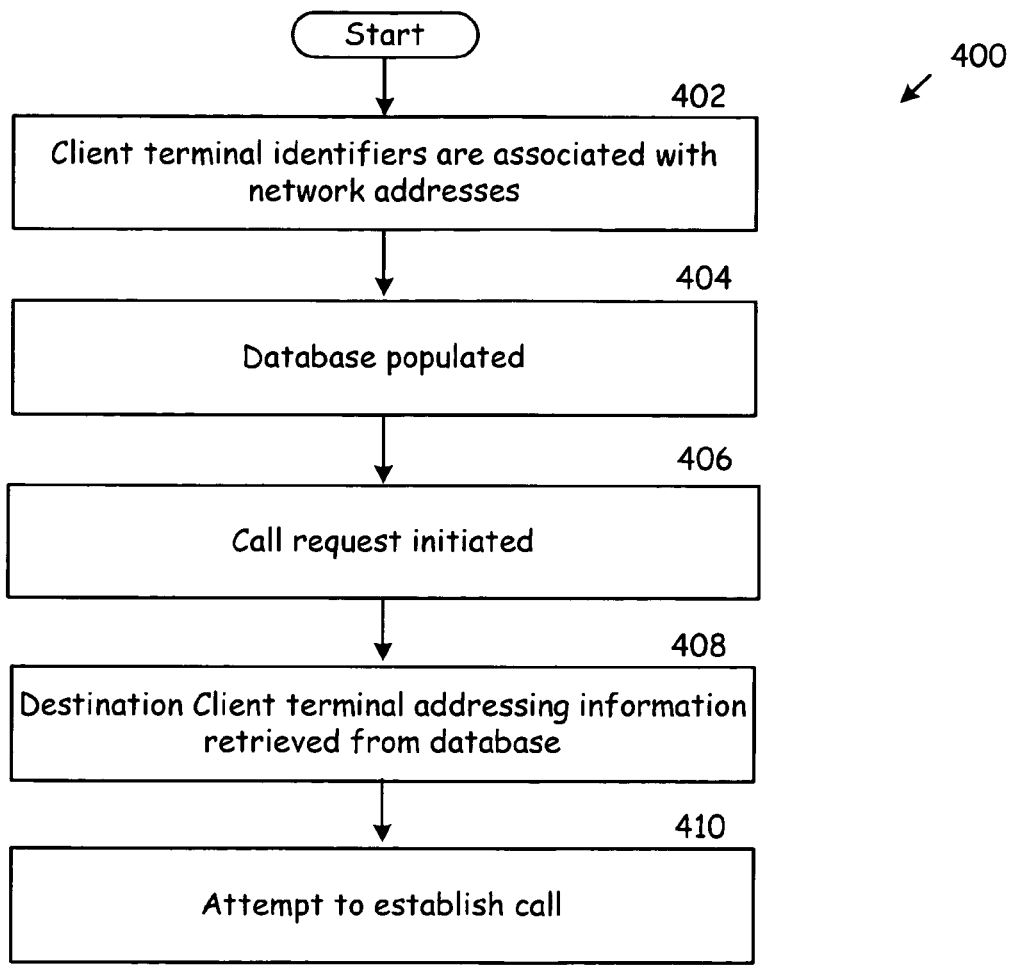
FIG. 8 provides a logic flow diagram illustrating the method of servicing a call between a source client terminal and a destination client terminal wherein the source and destination client terminals are serviced by differing service providers in accordance with one or more embodiments of the present invention.

FIGS. 8-13 provide logic flow diagrams that relate to specific operations performed in accordance with embodiments of the present invention. FIG. 8 provides a logic flow diagram illustrating a method of servicing a call between a source client terminal and a destination client terminal. Operations 400 begin with step 402. In step 402, client terminal identifiers are associated with client terminal network addresses. These associations are stored within a shared database available through a network connection. After this shared database has been populated in step 404, the shared database may be accessed to service call requests initiated from a source terminal in step 406. This call request should include a destination identifier such as a username, handle or other identifier. In step 408, the shared database is accessed based on the destination identifier within the call request to retrieve a network address associated with the destination client terminal. In step 410, the source client terminal may then attempt to establish a call with the destination client terminal using the network addresses retrieved in step 408. In addition to retrieving network address, metadata within the shared database may further define the communications between the source client terminal and the destination client terminal. This call may be a voice communication, such as VoIP or any combination of voice, audio, video, text or between the source client terminal and destination client terminal.

The data contained within the shared database may be periodically updated. As IP addresses are dynamically assigned, it may become necessary for client terminals to update the shared database periodically or when a specific events occur. These periodic updates maybe done using messaging services such as, but not limited to, text messaging, short-messaging services (SMS), email communications, instant messaging (IM), enhanced messaging service (EMS), and multi-media messaging services (MMS).

The metadata contained within the shared database may describe the communication capabilities, terminal capabilities and network capabilities. The communication capabilities and terminal capabilities may describe the types of communications that the terminals may support. For example, whether or not voice, text or multimedia communication capabilities are present. In addition to describing the capabilities of the terminal, user defined criteria regarding communications, the network capabilities associated with the client terminal may be included in the metadata. The network capability information may include bandwidth limitations, or whether or not dedicated band width is available.

Figure 9:
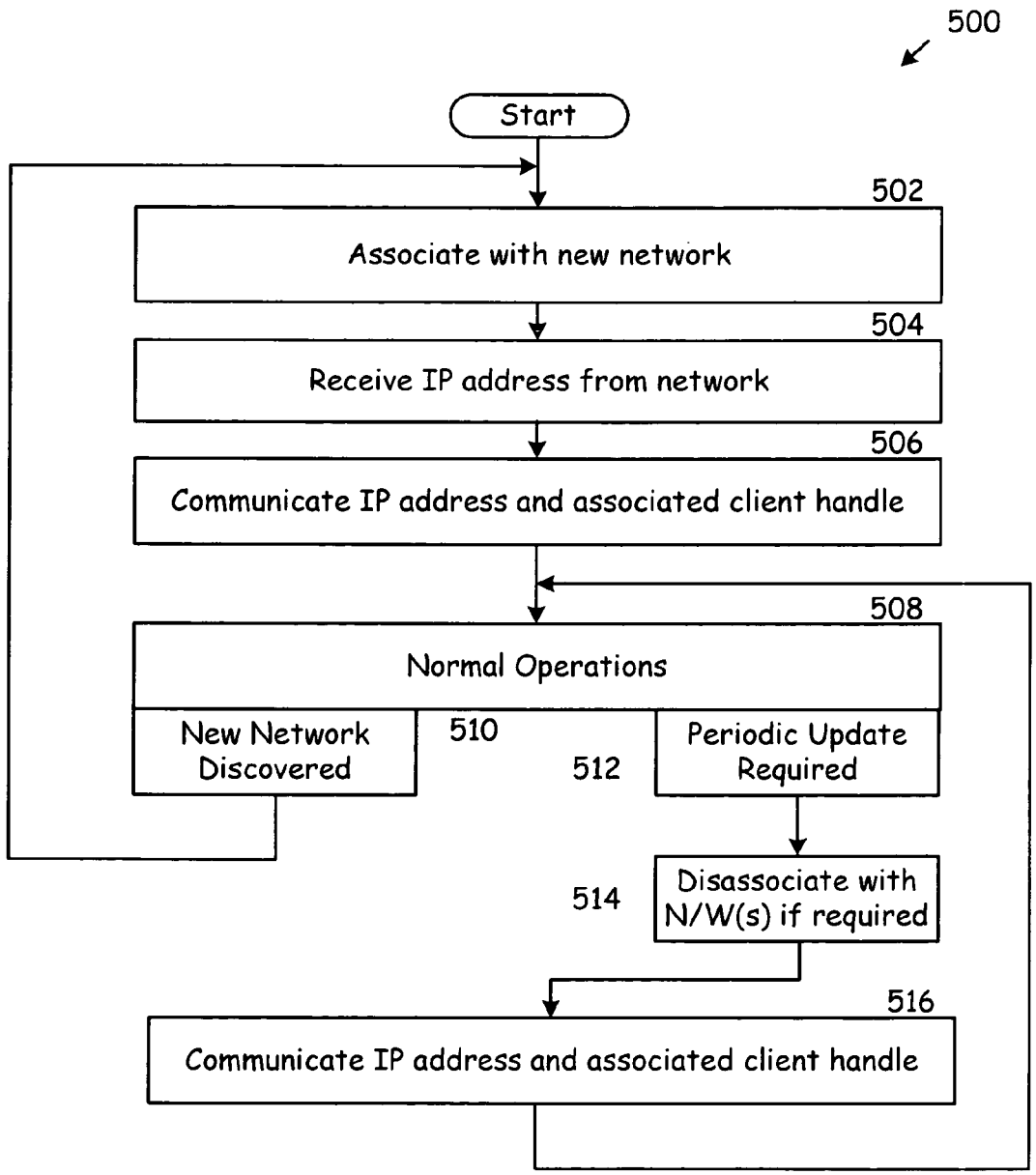
FIG. 9 provides a logic flow diagram illustrating how individual client devices may communicate to a network address information and meta data to a service provider or third party database in accordance with one or more embodiments of the present invention.

FIG. 9 is a flow chart illustrating operations 500 according to one embodiment of the present invention. These operations commence with a client terminal associating with a particular network in step 502. This new network may be a wireless network or a wired network. Upon association with the new network, the client terminal exchanges user information with the new network and the new network registers the client terminal. Registration may require password exchange from the client terminal to a point of access of the network, e.g., access point 140 or 142 of FIG. 1. The network then assigns a unique IP address to the client terminal and transmits the IP address to the client terminal in step 504. In response to receiving the IP address from the network, the client terminal communicates the IP address and additional information (i.e., username, handle, identifier and other metadata) to either the service provider or the shared database in step 506. For each IP address, the client terminal may report metadata, such as the new network type, current loading parameters of the new network, current noise/interference properties of the connection that the client terminal has to the new network, location information, security information and/or power usage characteristics performed by the client terminal in communicating with the new network. Additional information or metadata that may be reported by the client terminal may further include the cost associated with communicating via the new network, a user desirability of communicating via the new network, security information regarding the new network, and an access point IP address of the new network with which the client terminal associates, if available.

Referring again to FIG. 1, client terminal 102 may roam to the service area of access point 140 from the service area of access point 142. In this example, the client terminal is previously associated with access points 142 as well as with access point 140. Upon associating with the new access point 140, client terminal 102 becomes associated with the access point 140 and receives an IP address. In response, the client terminal 102 communicates the new IP address access point 142. Further, with the IP address reported, the client terminal may report the additional information as well. This report may also disassociate the client terminal from the previous network if applicable.

Referring again to FIG. 9, after communication of the IP addresses and the additional information is complete, normal operations are established in step 508. When the client terminal discovers another new network in step 510, operation returns to step 502. During normal operations 508, the client terminal may determine that a periodic update is required in step 512. This update may be required by a predetermined schedule or other like criteria. Such periodic update may require that the client terminal disassociate with one or more networks with which it is currently associated in step 514. When the client terminal disassociates with a network, the IP addresses and additional information may be directly or indirectly communicated to the shared database so that latency of addressing information within the shared database is reduced. From step 516, operation returns to step 508.

Figure 10:
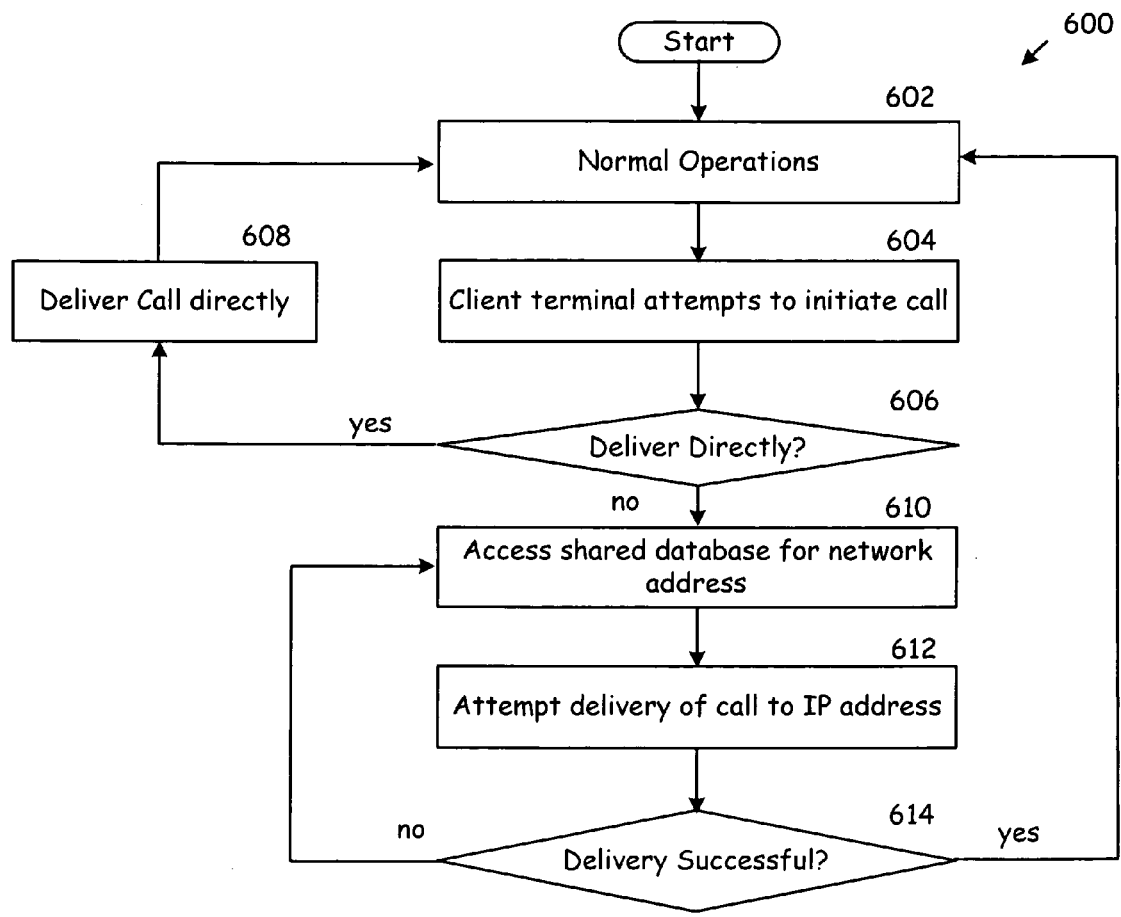
FIG. 10 provides a logic flow diagram depicting the initiation of a call from a client terminal serviced by a first service provider to a shared database.

FIG. 10 is a flow chart depicting the initiation of a call according to an embodiment of the present invention. Operations 600 commence at step 602 where a client terminal, performing normal operations, attempts to initiate a call with a call request in step 604. This call request initially seeks to establish a call using the service provider that serves the client terminal initiating the request. At a decision point 606, a determination is made as to whether or not the call may be established within the service provider servicing the first client terminal. If the call may be serviced entirely using the service provider servicing the client terminal initiating the call, then the call may be established directly with the destination terminal in step 608. However, if a determination is made that the service provider handling the destination client terminal is not the same as the service provider servicing the initiating client terminal, then the shared database is accessed in step 610. Access of the shared database yields either addressing information or vectoring information operable to direct the call request to the destination in step 612. The call request accesses the shared database using a username, handle, or other like identifier to retrieve the network address or vectoring information associated with the destination client terminal. In step 612, an attempt is made to establish the call with the network information accessed in step 610. At decision point 614, a determination is made whether or not the call was successfully delivered. If a successful call was established, normal operations for the client terminal will continue in step 602. Otherwise, if the network address is not valid or a successful call was not initiated at decision point 612, the call request may again access the shared database where the information within the database is updated and an alternative IP addresses for the client terminal may be sought from the shared database. The shared database may associate more than one network address with a username, handle, or identifier. This may involve associating more than one device with an individual username, handle or other like identifier where different devices have unique network addresses associated with the device, or where multiple network addresses are associated with a single device. Priority may be given to a first network address. Should that network address fail, an alternative network address may be sought for the destination terminal. This priority may be based on the most likely location of the user associated with the username, handle or identifier. Where multiple network addresses are associated with a destination terminal or a destination user, the different types of communication available may depend on the network address selected from the shared database. For example, a call may initially seek a voice call. Should the voice call fail, text instant messaging (IM) may be established between the source client terminal and destination client terminal. Additionally, should the destination client terminal be unavailable, the call may be directed to a voice mailbox having a different network address.

Figure 11:
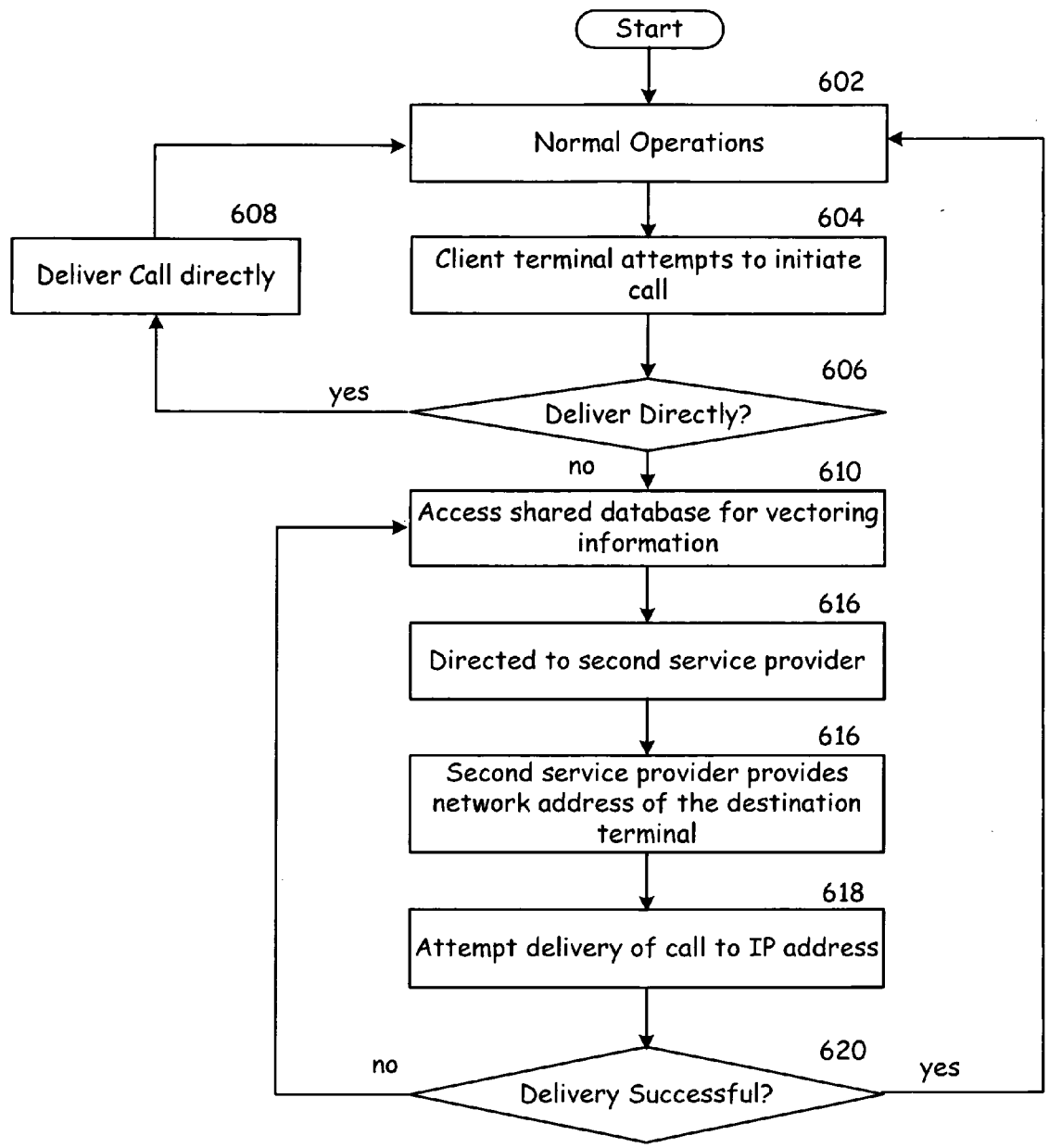
FIG. 11 provides a logic flow diagram wherein a first client terminal initiates a call to a second client and vectoring information is obtained from a third party database and is used to vector the call to the destination terminal in accordance with one or more embodiments of the present invention.

In FIG. 11, when the call is unable to be delivered directly using the first service provider as determined at decision point 604, the shared database may be accessed in step 608. In this case, vectoring information is retrieved from the shared database. In addition to vectoring information associated with the destination client terminal, metadata may be retrieved that may be used to define network capabilities, terminal capabilities, communication pathway capabilities, or other like information used to manage the call. This vectoring information may be used in step 616 to direct the call to a second service provider. This second service provider then may provide a network address of the destination terminal to the source client terminal. In step 618, an attempt is made to establish the call using information provided from the second service provider. At decision point 620, if the call is successfully established, normal operations will continue with step 602. Otherwise, the operation may be returned to step 608 to seek alternative addressing information wherein the call may be routed to another network address with alternative vectoring information or alternative addressing information as discussed with preference to FIG. 10.

Some network connections are not robust or the addressing information may become stale. The former is the case when a client terminal is on the fringe of a wireless coverage area and/or when the client terminal is roaming outside its normal service area. Further, the client terminal may be engaged in some activity such as participation with another network or may be asleep with respect to a particular network. Such other activity may prevent direct receipt of packet data based call directed at a specific network address. In such cases, indirect delivery according to the operations of FIG. 10 and 11 may be attempted.

Figure 12:
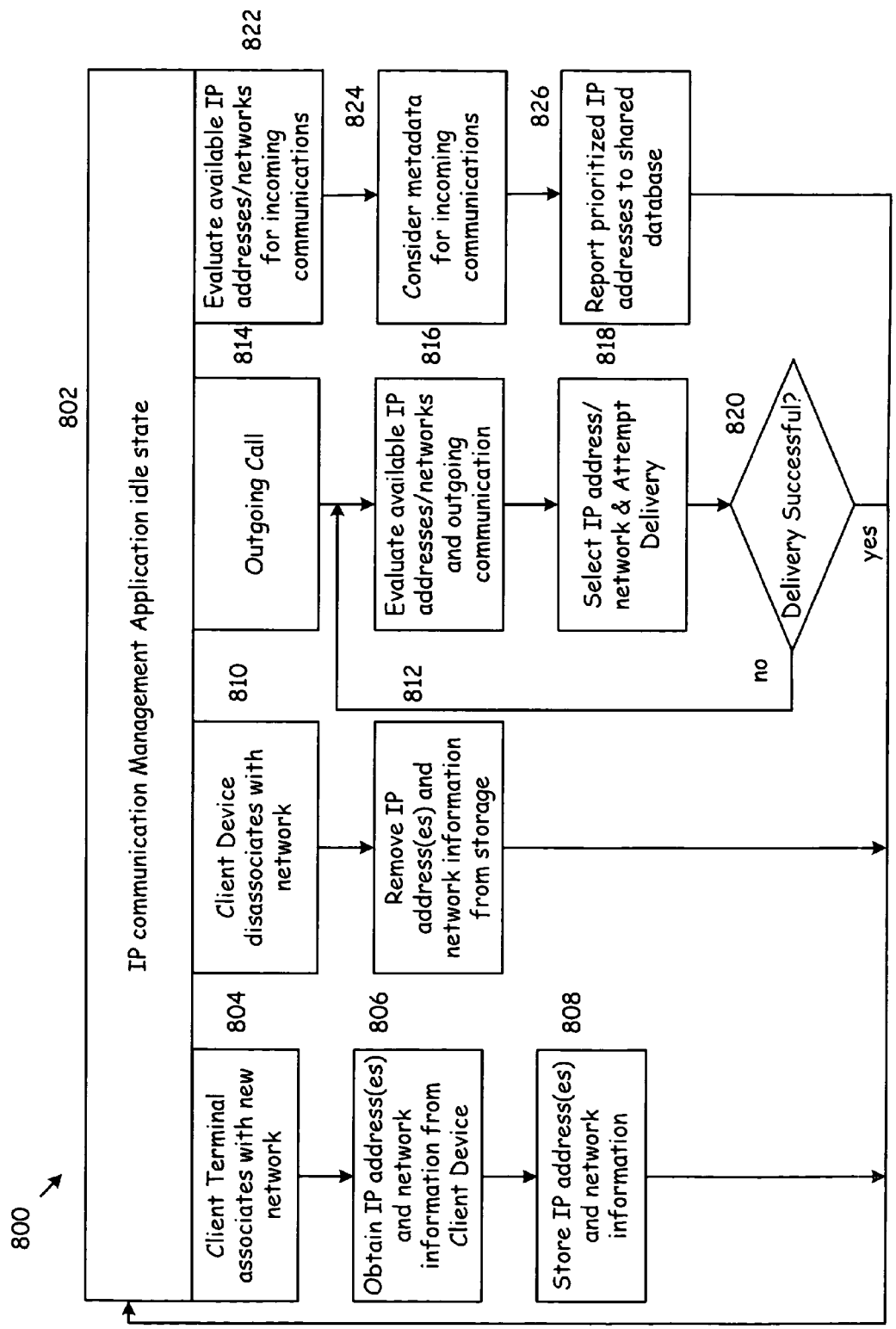
FIG. 12 provides a logic flow diagram describing an IP communication management application from a third party database.

FIG. 12 is a flow chart in accordance with an embodiment of the present invention. Operations 800 may be performed by a software application operating on a client terminal or server within the service provider. This application is operable to manage all available communication resources for the client terminal. For example, when the client terminal supports multiple network types, e.g., Bluetooth, WLAN, and LAN, this application keeps track of all of available network based communications. When client terminal example 102, associates with an access point, as was described with reference to FIG. 1, this network may provide a unique IP address to client terminal 102. The application running on the client terminal knows the IP addresses of each of the available network IP pathway options. The client application may also be operable to collect statistics related to each network connection. For example, data related to the performance of the connection, bandwidth of the connection, and the costs associated with the connection may be monitored using the client application. Then, based on all of the previously identified and collected information, when a particular task requires an IP pathway, the application assigns one of the pathways for the transaction. This information may also be reported to the shared database in order to manage incoming communications. The client application may, after priorities assigned to various IP addresses within the shared database, define the priorities of network addresses reported as being available to the shared database. This may be done based on the network capabilities, terminal capabilities, communication capabilities, and/or user input. For example, in a low bandwidth environment, the client application may assign a higher priority to a network address associated with a text messaging communication pathway rather than a voice communication or audio/visual communication pathway. This is because insufficient bandwidth is available to support these more robust communications. Alternatively, a user may direct, through the user interface or keypad of the client terminal, that only text communications should be received or that the device be placed in a privacy mode where text communications or voice communications are routed to an appropriate mailbox. In this way, the client application not only manages the routing of outgoing communications, but may also manage the routing of incoming communications.

Operations 800 of FIG. 12 commence with the IP communication management application operating in an idle state in step 802. From step 802, the client terminal may associate with a new network in step 804. In the association, the client terminal will receive an IP address and network information from a servicing access point or network. In response thereto, the IP communication management application obtains such IP addresses and network information from the client device in step 806. The IP communication management application will then store the IP addresses and network information received for the particular IP pathway in step 808. From step 808, operation returns to step 802. In another operation, the client device disassociates with a particular network in step 810. In such case, the IP communication management application removes the IP address or addresses associated with the network and the network information from storage in step 812. From step 812, operation returns to step 802.

In another operation, the client terminal desires to establish communications in step 814, (e.g., to a destination client terminal). In response thereto, the IP communication management application evaluates the type of communication desired and the available IP addresses and networks with which the client terminal is associated in step 816). Based upon this evaluation, the IP communication management application selects an IP address and a network for the packet data communication transmission and attempts delivery via the selected IP pathway in step 818. If delivery is not successful (as determined at step 820), operation returns to step 816. However, if the delivery is successful as determined at step 820, operation returns to step 802.

To support incoming communications, the client application is operable to evaluate the available IP addresses and networks in step 822. In step 824, user preferences will be considered for the prioritization of IP addresses for incoming communications. In step 826, the prioritized IP addresses and metadata associated with communication types and the various capabilities of the terminal network and communications are reported to the shared database such that the client application manages not only outgoing communications but incoming communications as well With operations 800 of FIG. 8, the IP communication management application may consider the data type for incoming and outgoing communications, a latency of each IP pathway, the cost of each IP pathway, and other relevant IP pathway considerations. For example, for some packet data servicing, the IP communication management application may select a low cost IP, high latency IP pathway for some type of communication, such as low priority text only, while selecting a low latency, high cost IP pathway for other types of packet data, such as voice or audio/visual communications. The IP communication management application may also select a particular IP path for packet data transmission based upon the network operational parameters of the available networks associated with the client terminal. For example, the IP communication management application may evaluate the traffic loading of the various available IP pathways prior to selecting an IP pathway for a particular packet data communication.

Figure 13:
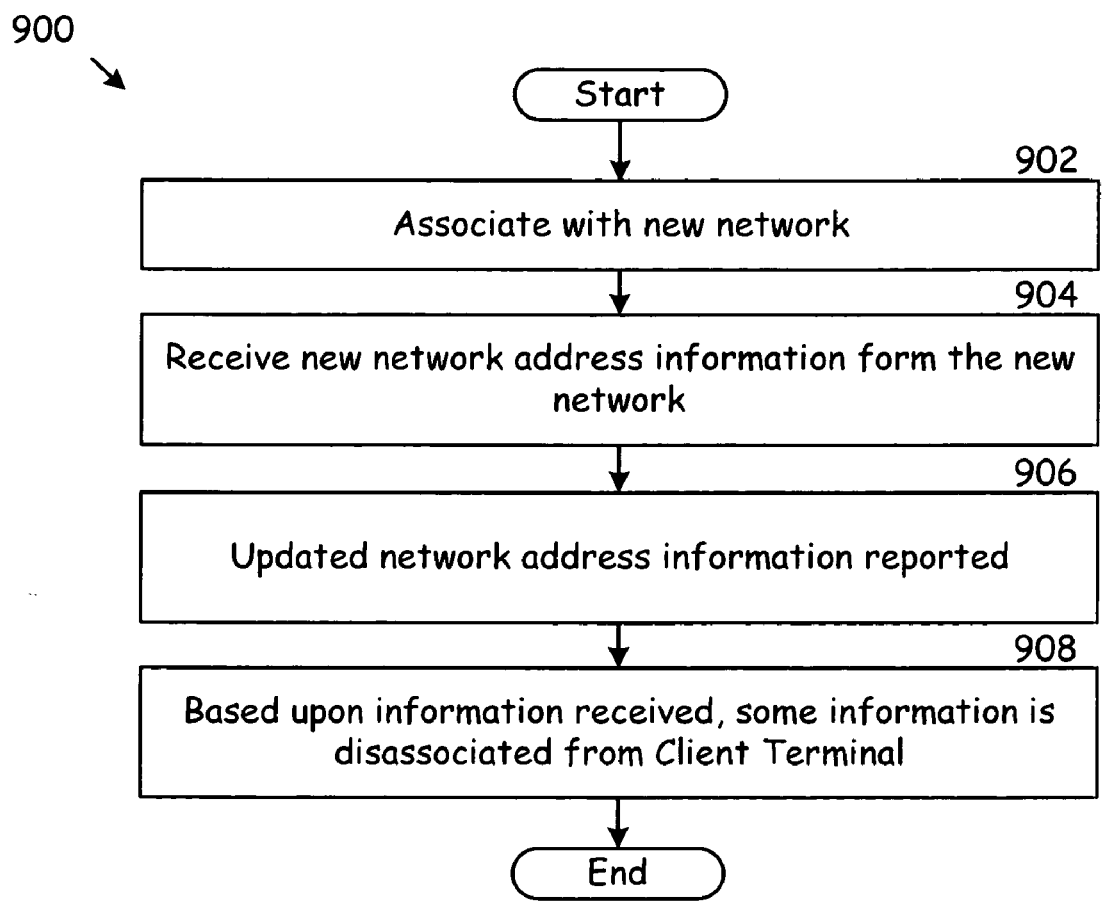
FIG. 13 provides a logic flow diagram describing how an individual client terminal may update network address information to a service provider or third party database in accordance with one or more embodiments of the present invention.

Operations 900 of FIG. 13 are particularly useful when the client terminal is mobile. Due to mobility, when a client terminal associates with a new network in steps 902 and 904, the client terminal may be outside the communication range of other previously associated networks. The prior addressing information may have become stale. Based on the current information, a previously associated address may be disassociated from the client terminal based upon the fact that the client terminal is now associated with a new network. In such case, a previously associated address may have a rules set that will automatically disassociate from the client terminal in step 906. This ensures that prior data that conflicts with current data is removed. Such operations prevent communication from being directed to stale or latent addresses by removing this stale information from the shared database. This improves the likelihood of establishing communications through those network pathways in a timely manner.

In summary, the present invention provides a network infrastructure operable to support the exchange of communications, such as voice communications, between a first client terminal having a first user identifier and service by a first service provider and a second (destination) client terminal having a second user identifier and serviced by a second service provider. This network infrastructure includes a packet-switch network, a shared database and a number of client terminals serviced by different service providers. These terminals include a network interface and are identified by their service provider by a network address. The shared database associates user identifiers with network addresses. This allows a user to access the shared database in order to initiate a call request from the first client terminal to the second client terminal. The first client terminal receives the network address or vectoring information on the network address of the destination terminal through the shared database. This shared database may also have metadata used to manage the call.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As one of average skill in the art will appreciate, the term "communicatively coupled", as may be used herein, includes wireless and wired, direct coupling and indirect coupling via another component, element, circuit, or module. As one of average skill in the art will also appreciate, inferred coupling (i.e., where one element is coupled to another element by inference) includes wireless and wired, direct and indirect coupling between two elements in the same manner as "communicatively coupled".

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A network infrastructure supporting call exchange between a first client terminal having a first client handle established with a first service provider and a second client terminal having a second client handle established with a second service provider, the network infrastructure comprising:
   a packet switched network communicatively coupled to both the first and second client terminals;
   a shared database communicatively coupled to the packet switched network;
   the first client terminal comprising a first network interface that has at least one first network address;
   the second client terminal comprising a second network interface that has at least one second network address;
   the first client terminal configured to associatively store the first client handle and the at least one first network address within the shared database, the first client handle comprising a first service provider identifier identifying the first service provider;
   the second terminal configured to associatively store the second client handle and the at least one second network address within the shared database, the second client handle comprising a second service provider identifier identifying the second service provider;
   the first client terminal configured to transmit the second client handle to the shared database to retrieve the at least one second network address from the database associated with the second client handle; and
   the first client terminal establishes a call with the second terminal using the at least one second network address.

2. The network infrastructure of claim 1, wherein metadata associated with the first client handle and second client handle is stored in the shared database.

3. The network infrastructure of claim 2, wherein the metadata comprises communication capabilities, client terminal capabilities, or network capabilities.

4. The network infrastructure of claim 2, wherein the call is managed using the metadata.

5. The network infrastructure of claim 1, wherein the client handle comprises:
   a user identifier.

6. The network infrastructure of claim 1, wherein the client terminals are operable to store a client handle and network address associated with the client terminal to internal memory.

7. The network infrastructure of claim 1, wherein at least one additional network address is associated with the client terminals, and the at least one additional network address is stored to the shared database and associated with the client handle.

8. The network infrastructure of claim 1, wherein the call is a Voice over Internet Protocol (VoIP) call.

9. The network infrastructure of claim 1, wherein the call comprises audio and video communications.

10. The network infrastructure of claim 1, wherein the call comprises text communications.

11. A network infrastructure operable to support call exchange between a first client terminal having a first client handle established with a first service provider and a second client terminal having a second client handle established with a second service provider, the second service provider having a second provider network address, the network infrastructure comprising:
   a packet switched network communicatively coupled to both the first and second client terminals;
   a shared database communicatively coupled to the packet switched network;
   the first client terminal comprising a first network interface that has at least one first network address;

the second client terminal comprising a second network interface that has at least one second network address;

the second client terminal configured to associatively store the second client handle and the second provider network address to the shared database, the second client handle comprising both a user identifier and a first service provider identifier identifying the first service provider;

the first client terminal configured to produce the second client handle to the database and to retrieve the second provider network address from the database using the second client handle; and the first client terminal is configured to use the second provider network address and the second client handle to establish a call with the second client terminal.

12. The network infrastructure of claim 11, wherein the first client terminal is configured to interact with the second provider to retrieve at least one network address associated with the second client terminal is operable to establish the call with the at least one network address associated with the second client terminal.

13. The network infrastructure of claim 11, wherein the second client terminal is configured to register the second client handle and second network address with the second service provider.

14. The network infrastructure of claim 11, wherein authorization of the call is required from the second client terminal to the first client terminal to establish the call.

15. The network infrastructure of claim 11, wherein metadata associated with the second client terminal is operable to define communication capabilities, client terminal capabilities, or network capabilities of the second client terminal.

16. The network infrastructure of claim 15, wherein the call is managed using the metadata.

17. The network infrastructure of claim 11, wherein the client terminals are operable to store a client handle, metadata, and network addresses associated with the client terminal to internal memory.

18. The network infrastructure of claim 11, wherein at least one additional network address is associated with the client terminals, and the at least one additional network address is stored to the second service provider.

19. The network infrastructure of claim 11, wherein the call is a Voice over Internet Protocol (VoIP) call.

20. The network infrastructure of claim 11, wherein the call comprises audio and video communications.

21. The network infrastructure of claim 11, wherein the call comprises text communications.

* * * * *